(12) United States Patent
Lambert et al.

(10) Patent No.: US 8,254,296 B1
(45) Date of Patent: Aug. 28, 2012

(54) PEER-TO-PEER FREQUENCY BAND NEGOTIATION

(75) Inventors: Paul A. Lambert, Mountain View, CA (US); Milind Kopikare, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 329 days.

(21) Appl. No.: 12/716,569

(22) Filed: Mar. 3, 2010

Related U.S. Application Data

(60) Provisional application No. 61/161,704, filed on Mar. 19, 2009.

(51) Int. Cl.
*H04L 5/14* (2006.01)

(52) U.S. Cl. .................................. 370/295; 370/281

(58) Field of Classification Search ............ 370/295, 370/302, 304, 343, 344, 349, 480; 709/227, 709/228, 237, 230
See application file for complete search history.

(56) References Cited

U.S. PATENT DOCUMENTS

| | | | |
|---|---|---|---|
| 4,337,463 A | 6/1982 | Vangen | |
| 7,239,882 B1 * | 7/2007 | Cook | 455/519 |
| 7,342,895 B2 * | 3/2008 | Serpa et al. | 370/254 |
| 7,595,768 B2 | 9/2009 | Li et al. | |
| 7,957,340 B2 * | 6/2011 | Choi et al. | 370/328 |
| 7,966,036 B2 | 6/2011 | Kojima | |
| 8,072,913 B2 | 12/2011 | Desai | |
| 8,078,111 B2 * | 12/2011 | Jovicic et al. | 455/63.1 |
| 2004/0192222 A1 | 9/2004 | Vaisanen et al. | |
| 2005/0174962 A1 | 8/2005 | Gurevich | |
| 2006/0079232 A1 | 4/2006 | Omori et al. | |
| 2006/0268756 A1 | 11/2006 | Wang et al. | |
| 2007/0014314 A1 * | 1/2007 | O'Neil | 370/503 |
| 2008/0181154 A1 | 7/2008 | Sherman | |
| 2008/0232287 A1 | 9/2008 | Shao et al. | |
| 2009/0196210 A1 | 8/2009 | Desai | |
| 2009/0239471 A1 | 9/2009 | Tran et al. | |
| 2009/0247217 A1 | 10/2009 | Hsu et al. | |
| 2010/0069112 A1 | 3/2010 | Sun et al. | |
| 2010/0130129 A1 | 5/2010 | Chang et al. | |
| 2010/0316027 A1 | 12/2010 | Rick et al. | |
| 2011/0007675 A1 | 1/2011 | Chiou et al. | |
| 2011/0009074 A1 | 1/2011 | Hsu et al. | |

OTHER PUBLICATIONS

"Non-Final Office Action", U.S. Appl. No. 12/484,563, (Oct. 4, 2011), 13 pages.
"Non-Final Office Action", U.S. Appl. No. 12/616,454, (Dec. 22, 2011), 8 pages.
"Final Office Action", U.S. Appl. No. 12/484,563, (Apr. 24, 2012), 18 pages.
"Final Office Action", U.S. Appl. No. 12/616,454, (Apr. 11, 2012), 19 pages.
"Notice of Allowance", U.S. Appl. No. 12/484,563, (Jul. 9, 2012), 6 pages.

* cited by examiner

*Primary Examiner* — Brenda H Pham

(57) ABSTRACT

The present specification describes techniques and apparatuses for peer-to-peer frequency band negotiation. In some embodiments, techniques are described using a bit vector that are fast and/or require low data throughput.

19 Claims, 9 Drawing Sheets

PEER-TO-PEER FREQUENCY BAND NEGOTIATION

RELATED APPLICATION

This application claims priority to U.S. Provisional Patent Application Ser. No. 61/161,704 filed Mar. 19, 2009, the disclosure of which is incorporated by reference herein in its entirety.

BACKGROUND

Unless otherwise indicated herein, the approaches described in this section are not prior art to the claims in this application and are not admitted to be prior art by inclusion in this section.

Wireless local area networks (WLANs), wireless personal area networks (PANs), and other wireless networks commonly permit basestation-oriented or peer-to-peer-oriented communications. Basestation-oriented communications have a clear master-slave structure, which helps facilitate selection of a best frequency band for communication between the basestation and other wireless devices of the network. Peer-to-peer-oriented communications do not have an authoritative structure to facilitate selection of a best frequency band, and therefore peer devices generally need to negotiate. Conventional peer-to-peer frequency-band negotiation, however, is often slow and/or requires significant throughput to perform. In part this is a problem because wireless peer devices often perform this band negotiation within relatively low-throughput frequency bands or using low-throughput protocols.

SUMMARY

This summary is provided to introduce subject matter that is further described below in the Detailed Description and Drawings. Accordingly, this Summary should not be considered to describe essential features nor used to limit the scope of the claimed subject matter.

In one aspect, a method is described that includes discovering a first wireless peer device at a first frequency band of a predetermined set of frequency bands, receiving a bit vector at the first frequency band and from the first wireless peer device, a bit of the bit vector associated with a second frequency band of the predetermined set of frequency bands and indicating a first-device communication capability at the second frequency band, determining, based on the bit of the bit vector and a second-device communication capability at the second frequency band for communications by a second wireless peer device, that the second frequency band is preferred over the first frequency band for communications between the first wireless peer device and the second wireless peer device, and the second wireless peer device communicating with the first wireless peer device at the second frequency band.

In another aspect, a method is described that includes a second wireless device discovering a first wireless peer device at a first frequency band of a set of predetermined frequency bands, transmitting, from the second wireless device, a bit vector to the first wireless peer device at the first frequency band, a bit of the bit vector associated with a second frequency band of the set of frequency bands and indicating a second-device communication capability at the second frequency band, receiving, responsive to transmitting the bit vector, an indication that the second frequency band will be used by the first wireless peer device, and the second wireless device communicating with the first wireless peer device at the second frequency band.

In still another aspect, a method is described that includes receiving a bit vector at a first frequency band of a predetermined set of frequency bands and from a first wireless peer device, two bits of the bit vector associated with a second frequency band of the predetermined set of frequency bands and indicating three or more levels of communication preference of the first wireless peer device at the second frequency band and another two bits of the bit vector associated with a third frequency band of the predetermined set of frequency bands and indicating three or more levels of communication preference of the first wireless peer device at the third frequency band, determining, based on the two bits, the other two bits, and two or more levels of communication preference of a second wireless peer device at the second frequency band and two or more levels of communication preference of the second wireless peer device at the third frequency band, whether the first frequency band, the second frequency band, or the third frequency band is capable of providing a best data throughput for future communications between the first wireless peer device and the second wireless peer device, and transmitting the determined frequency band to the first wireless peer device.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques for peer-to-peer frequency band negotiations are often slow and/or require significant throughput to perform. This disclosure describes techniques and apparatuses for peer-to-peer frequency band negotiation that are fast and/or do not require significant throughput to perform.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
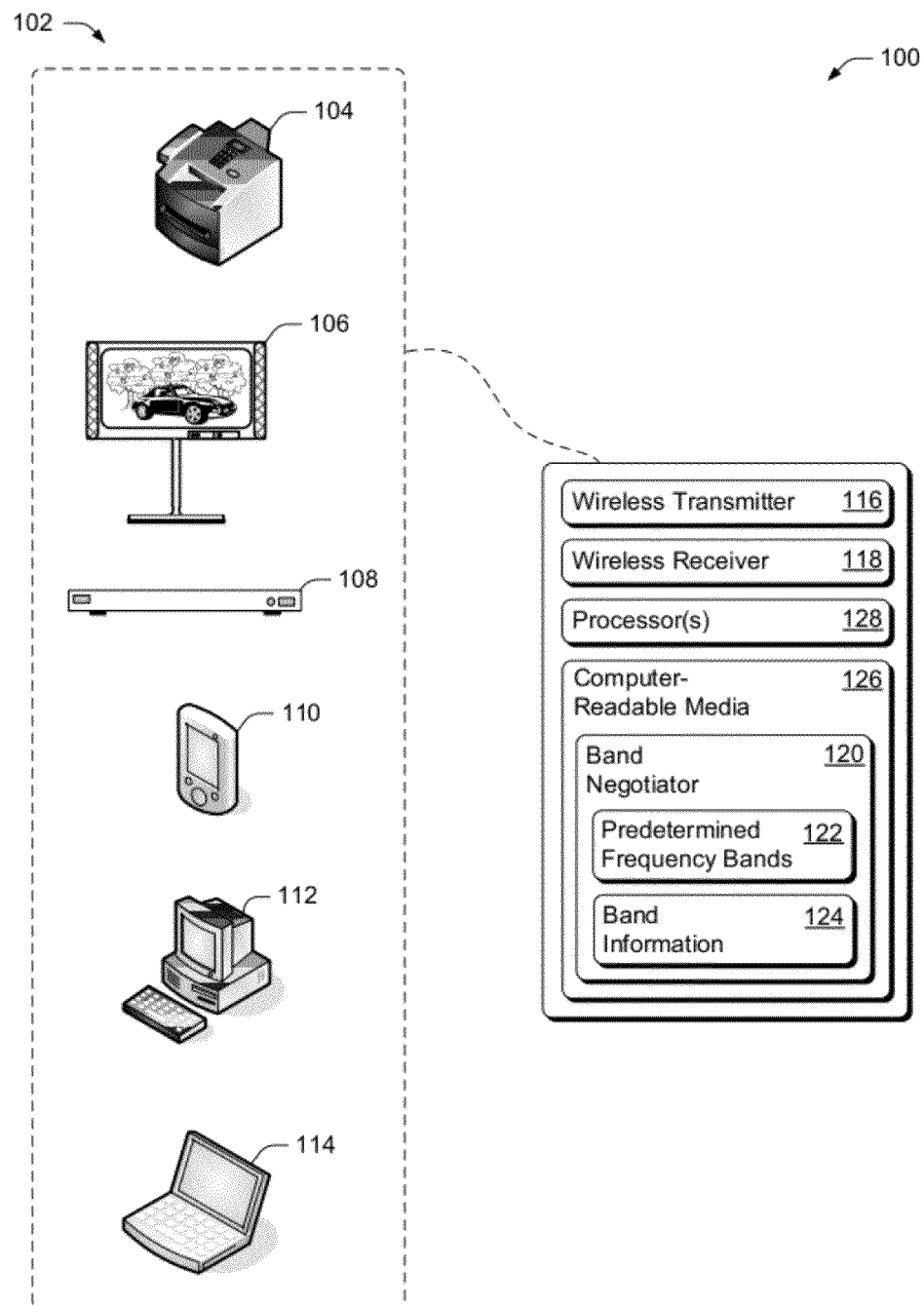
FIG. 1 illustrates an operating environment having wireless peer devices in accordance with one or more embodiments.

FIG. 1 illustrates an operating environment 100 having wireless peer devices 102, which are capable of transmitting and receiving wireless communications in a network, such as a wireless local area network (WLAN) or a wireless personal area network (WPAN). Devices 102 include a printing device 104, a wireless-enabled video display 106, a set-top box 108, and personal computing devices including a cellular phone 110, a desktop computing device 112, and a laptop computing device 114.

Each of devices 102 includes a wireless transmitter 116, a wireless receiver 118, and a band negotiator 120 for negotiating a frequency band in which to communicate. Each of devices 102 is capable of handling wireless communications conforming to various communication protocols, such as, for example, those of the IEEE 802.11 family of protocols. Transmitter 116 and receiver 118 may be separate (shown) or combined (often called a transceiver, not shown) and may be hardware combined with or separate from software or firmware. Devices 102 may also include multiple receivers and transmitters as well, thereby enabling communication on multiple frequency bands simultaneously.

Band negotiator 120 is capable of enabling wireless peer device 102 to negotiate in which frequency band to communicate. In many cases this negotiation finds a better frequency band in which to communicate than the band in which the negotiations are performed. Band negotiator 120 may do so using a bit vector representing frequency bands of a set of predetermined frequency bands 122. This set of bands 122 is predetermined in that information about the bands (band information 124) is held by device 102. This band information 124 helps simplify and reduce information transmitted as part of a frequency band negotiation. By way of example, band information 124 may indicate which bands have a generally higher throughput than others, which are subject to a government mandate requiring a passive search for radar transmissions before use and geographic regions for this requirement, geographic regions in which a band or bands are restricted or not generally used, and a corresponding order of a bit vector to the bands in the set of bands 122 (e.g., first bit corresponds to first band, etc.). Ways in which band negotiator 120 may act are set forth in greater detail below.

Band negotiator 120 includes a set of computer-executable instructions stored on computer-readable media 126. When executed by one or more processors 128, wireless peer device 102 acts according to those instructions. Band negotiator 120 may act independently or in conjunction with various other entities, such as transmitter 116 and receiver 118, and may be separate from or integral with other entities of device 102 as well, such as by being firmware integrated into a System-on-Chip (SoC) having or communicating with transmitter 116 and receiver 118.

Techniques for Peer-to-Peer Frequency Band Negotiation

The following discussion describes techniques for peer-to-peer frequency band negotiation, which in many cases enable peer devices to quickly and efficiently find a better frequency band. These techniques can be implemented utilizing the previously described environment, such as band negotiator 120 of FIG. 1. These techniques include methods illustrated in FIGS. 2, 6, and 7, each of which is shown as a set of operations performed by one or more entities. These methods are not necessarily limited to the orders shown for performing the operations.

Figure 2:
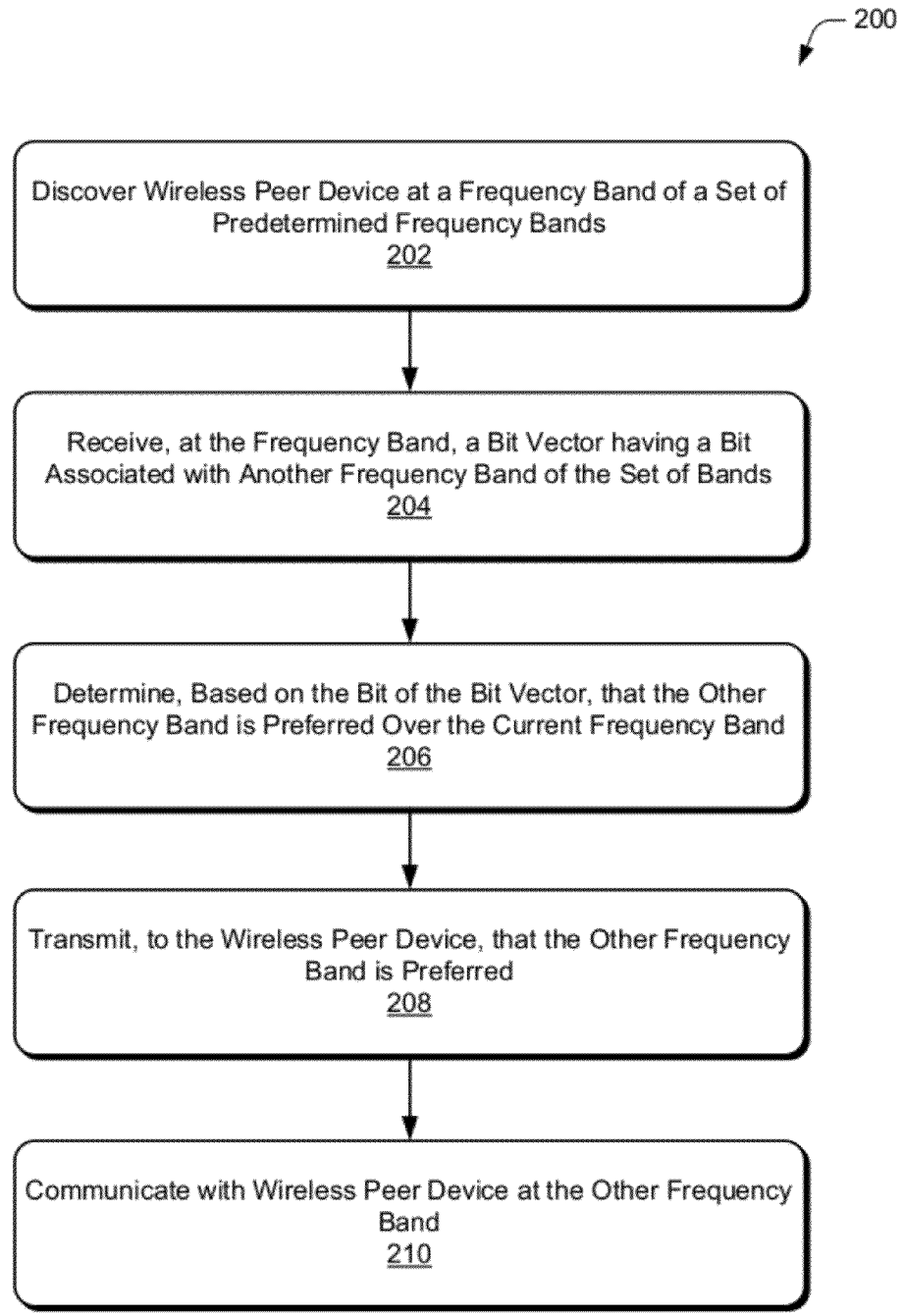
FIG. 2 illustrates a method for peer-to-peer frequency band negotiation using a bit vector and from the perspective of a wireless peer device that receives the bit vector and determines a preferred frequency band, in accordance with one or more embodiments.

FIG. 2 depicts a method 200 for peer-to-peer frequency band negotiation using a bit vector and from the perspective of a wireless peer device that receives the bit vector and determines a preferred frequency band.

At 202, a wireless peer device is discovered at a frequency band of a set of predetermined frequency bands. Wireless peer devices 102 can discover each other's presence in various manners. For example, wireless peer devices 102 may transmit beacons in an attempt to solicit a response. These transmissions can be performed at a particular frequency or many frequencies until a response is received. Wireless peer devices 102 may also discover each other using a preset frequency band, which is generally a frequency band having lower throughput but wide acceptance by wireless peer devices likely to be encountered.

Figure 3:
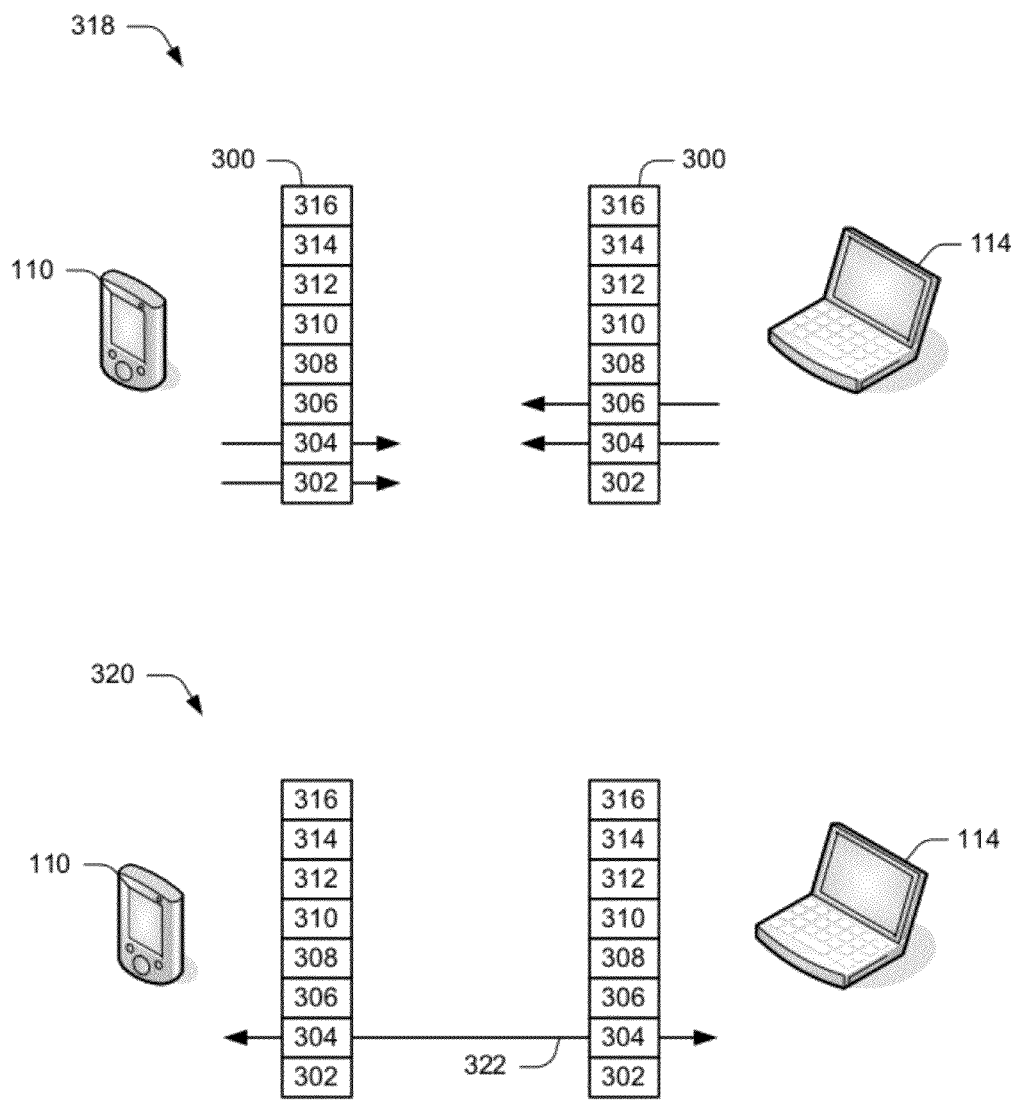
FIG. 3 illustrates wireless peer devices and a set of predetermined frequency bands in accordance with one or more embodiments.

Consider, at FIG. 3, example wireless peer devices (cellular phone 110 and laptop computing device 114) and a set of predetermined frequency bands 300 having bands 302 through 316, illustrated at 318. Cellular phone 110 is illustrated transmitting at two frequency bands, shown at band 302 and band 304. Laptop computing device 114 is illustrated transmitting at two frequency bands, shown at band 304 and band 306. Note that these devices are both attempting to discover another wireless peer device at one common band, namely band 304. This common band, band 304, is the band in which communications are first established and the wireless peer devices 102 discover each other. This is illustrated in FIG. 3 at 320, which shows successful discovery between cellular phone 110 and laptop computing device 114. This successful communication is through band 304, illustrated with arrow 322. At this point, however, post discovery communications to negotiate a better frequency band have not yet commenced.

At 204, a bit vector having a bit associated with another frequency band of the set of predetermined bands is received. As will be discussed in greater detail below, a bit vector may include multiple bits for multiple associated frequency bands, each bit indicating a capability (or lack thereof) of a wireless peer device 102 to communicate at a frequency band associated with that bit. Other bits may indicate additional information associated with a frequency band, such as protocol information (e.g., protocol type, protocol length) and levels of preference for a particular frequency band.

Figure 4:
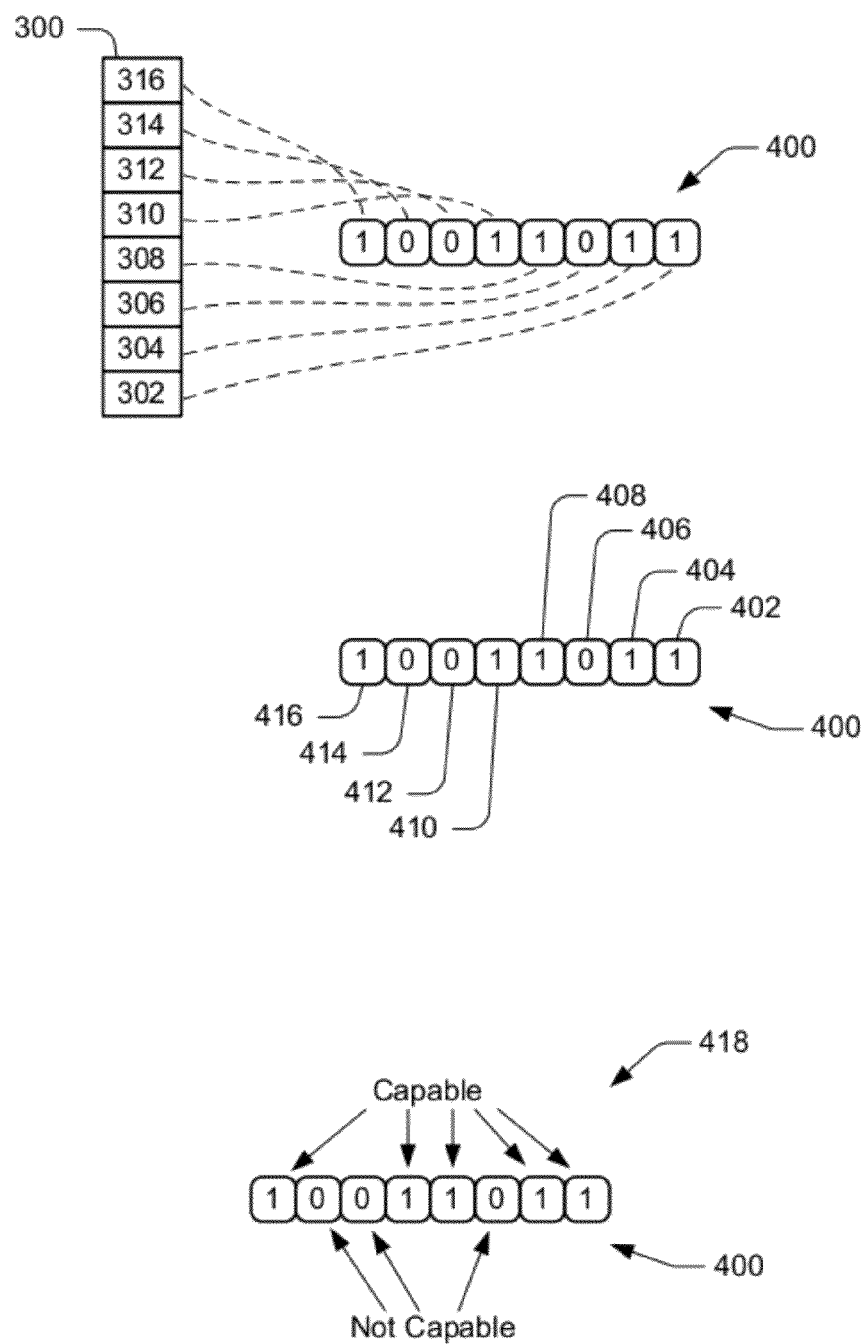
FIG. 4 illustrates a bit vector associated with the set of predetermined frequency bands of FIG. 3 in accordance with one or more embodiments.

In the ongoing example, band negotiator 120 of laptop computing device 114 receives a bit vector having a bit for each frequency band of the set of predetermined frequency bands. The bit vector is illustrated in FIG. 4, which shows the set of predetermined frequency bands 300 and a corresponding bit for each band in a bit vector 400. Each bit, 402 through 416, is associated with frequency band 302 through 316 having similar numbers. Thus, frequency band 302 is associated bit 402, frequency band 304 is associated with bit 404, and so forth to 316 and 416.

This example bit vector 400 is shown having various ones and zeros for each bit 402 through 416. Here a number one "1" indicates that a wireless peer device from which the bit vector is received is capable of communicating at the frequency band associated with a bit. Here we assume that laptop computing device 114 receives bit vector 400 from cellular phone 110. Thus, cellular phone 110 is indicating that it is capable of wireless communication at frequency bands 316, 310, 308, 304, and 302 and incapable at frequency bands 314, 312, and 306 (all shown at 418). These capabilities or incapabilities can reflect a device's actual ability (e.g., having hardware capable of receiving and transmitting at the frequency band) or the device's current preference. A device may be capable, in an absolute sense, of communicating at a particular frequency band but send a zero "0" because of interference at that band or government regulation currently restricting use of that band. This is described in greater detail below.

Figure 5:
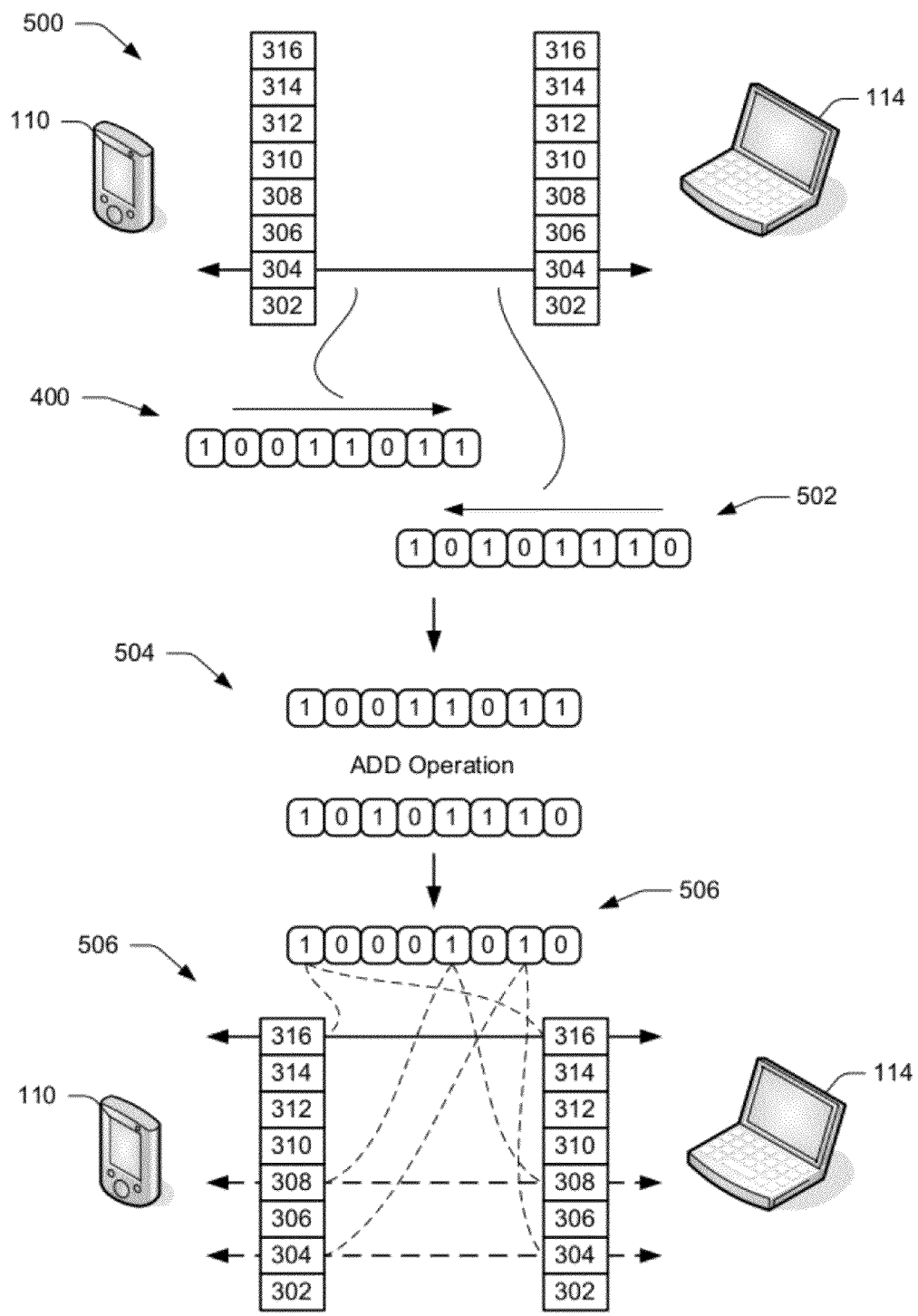
FIG. 5 illustrates the wireless peer devices of FIG. 3 communicating bit vectors and other actions in accordance with one or more embodiments.

Reception of bit vector 400 by laptop computing device 114 is illustrated in FIG. 5 at 500. Here communication is shown via band 304 of bit vector 400 from cellular phone 110. An optional operation is also shown, that of transmitting bit vector 502 across band 304 from laptop computing device 114 to cellular phone 110. Like bit vector 400, bit vector 502 includes bits associated with frequency bands, respectively, that indicate a capability or incapability of the transmitting device to communicate in those frequency bands.

At 206, it is determined that another frequency band is preferred over the currently frequency band. This determination is based on at least one bit of the bit vector received at 204 and capabilities of the wireless peer device that received the bit vector. This bit is associated, as noted above, with another frequency band of the set of predetermined bands.

In the ongoing example, eight bits are received in bit vector 400 by band negotiator 120 of laptop computing device 114. Also in this example, the capabilities of the receiving device 114 are represented with bit vector 502. As noted, the receiving device may transmit a bit vector, though this is not required. If transmitted, the other wireless peer device 102 gains additional information permitting the other wireless peer device 102 to also or instead determine a better frequency band.

In some embodiments band negotiator 120 may quickly and easily determine which frequency bands of the set of predetermined frequency bands 300 by performing an add operation on a received bit vector and a local bit vector (e.g., the bit vector 502 optionally transmitted as noted above). This add operation is illustrated at 504 in FIG. 5. The result is shown at 506, which indicates which of the bands are available for communication. In this example, three of the eight frequency bands are available: band 316, band 308, and band 304. This availability is shown with the resulting ones "1" in the associated bits. The bits-to-band associations are illustrated with dashed lines. In some cases a bit vector may exclude a band in which discovery of the other wireless peer device 102 is made. In this case, however, band 304 is included in the set of predetermined frequency bands 300 and represented in bit vector 400.

In some cases, such as those in which only one other frequency band is available, the determination to use that other frequency band can be complete. In this example, three frequency bands are available. Determining which of the three frequency bands to use involves band information 124. As noted above, band information 124 may indicate which frequency band is most preferred as a general rule, such as because it has a highest data throughput or other advantage (e.g., low power usage, etc.).

In one implementation, the better frequency bands of the set of predetermined frequency bands 300 are those with the higher numbers. Thus, frequency band 316 is generally the best band. As such, band negotiator 120 of laptop computing device 114 determines that band 316 will be used for future communications with cellular phone 110. This determination is shown with a solid arrow, the other available bands shown with dashed arrows.

Also as noted above, a bit vector may include additional bits having additional information such as protocol information or levels of preference. In such a case, a frequency band that is generally preferred because of higher throughput may not be selected as the preferred band.

At 208, the preference for the other frequency band is transmitted to the other wireless peer device. This operation is not required, however. In some cases, the other wireless peer device also determines that the other frequency band is preferred. This can be the case at least when a bit vector is transmitted to this wireless peer device, such as bit vector 502.

In this example, however, band negotiator 120 of laptop computing device 114 transmits, through wireless transmitter 118, that band 316 is preferred. This may be performed in various manners, such as transmitting a new bit vector having all zeros except for the bit corresponding to band 316.

At 210, communications are made with the wireless peer device in the other frequency band. Method 200 can be used as part of the initial discovery of another wireless peer device such as the example described above. Method 200 can also be used at other periods and in other situations, such as when ongoing communications at a particular frequency band are determined to be insufficient or degrading. Using the ongoing example, if frequency band 316 degrades, some operations of method 200 can be performed again to find another frequency band, which in this case would likely be band 308.

Figure 6:
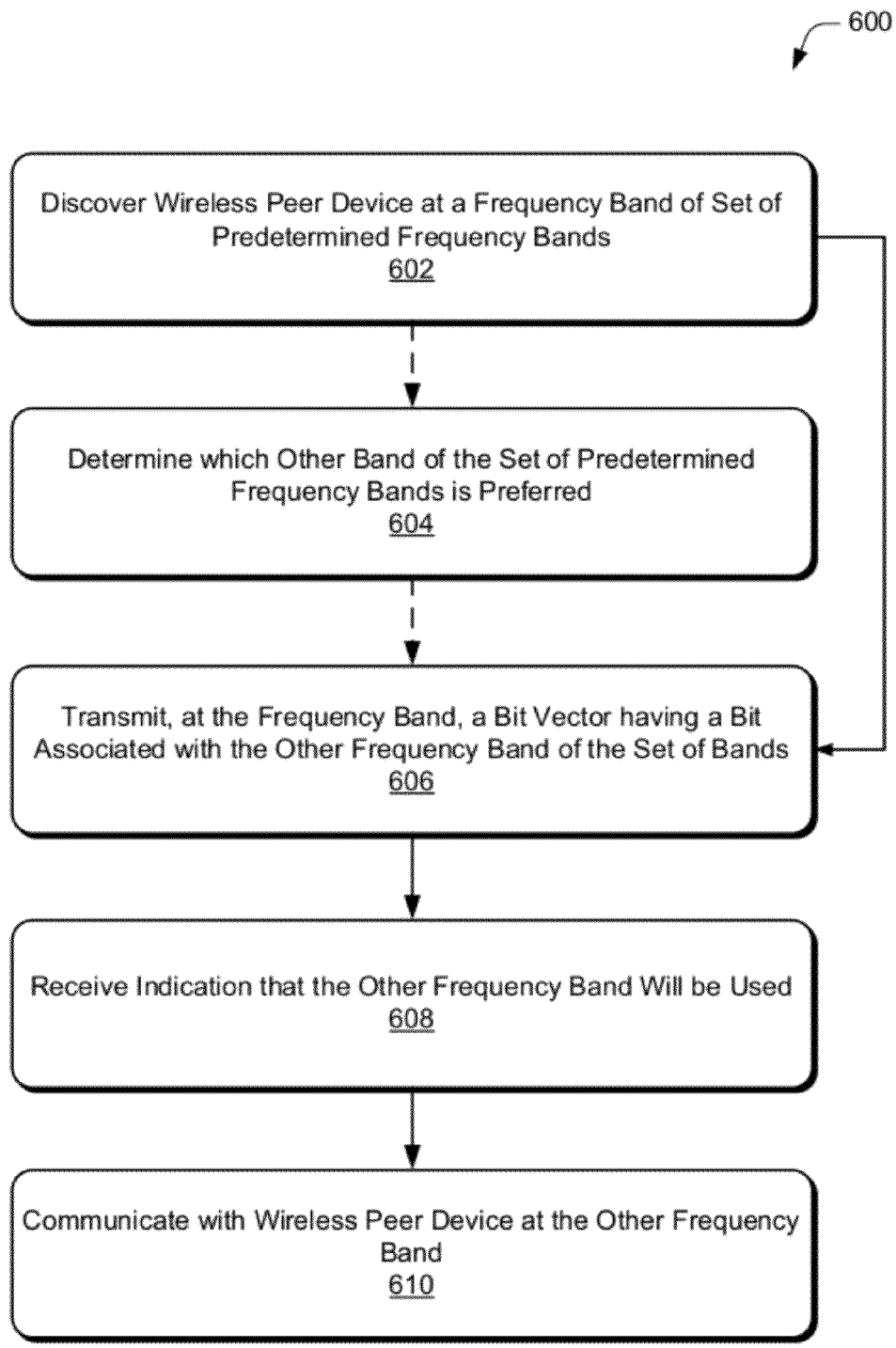
FIG. 6 illustrates a method for peer-to-peer frequency band negotiation using a bit vector and from the perspective of a wireless peer device that transmits the bit vector and receives an indication of a preferred frequency band.

FIG. 6 depicts a method 600 for peer-to-peer frequency band negotiation using a bit vector and from the perspective of a wireless peer device that transmits the bit vector and receives an indication of a preferred frequency band from another wireless peer device.

At 602, a wireless peer device is discovered at a frequency band of a set of predetermined frequency bands. This discovery of another wireless peer device can be performed in one or more ways described above, such as the example illustrated in FIG. 3.

At 604, another band of the set of predetermined frequency bands is determined to be preferred. This operation, as shown by the dashed line preceding from 602 to 604 and from 604 to 606, is optional. In some cases, for example, the wireless peer device that is performing the operation at 604 simply indicates one or more frequency bands through which the device is capable of transmitting and receiving. Alternatively, however, operation 604 determines which frequency band is preferred based on information that may change. For example, assume that cellular phone 110 is capable of using five different frequency bands, such as bands 316, 310, 308, 304, and 302. This is illustrated at 500 in FIG. 5. Assume also that some of these five bands may be more or less preferred based on various factors. One such factor is that a band may be prohibited if radar is detected in that band or if the wireless peer device determines that it is not permitted based on the device's geographical location. Another such factor is interference, which cellular phone 110 may scan for and find in various bands. Further still, the device may have multiple transceivers and so be using one of these five frequency bands at the time of the negotiation. In these and other cases, band negotiator 120 determines which frequency bands it prefers based on one or more of these factors. This determination may be binary (yes/no) or include various levels of preference. Levels of preference are described in greater detail as part of method 700.

In either case, at 606 a bit vector having a bit associated with another frequency band of the set of predetermined frequency bands is transmitted to the wireless peer device. Continuing, in part, the example described as part of FIGS. 3 through 5 above, assume that bit vector 400 is transmitted at band 304 from cellular phone 110 to laptop computing device 114.

As noted above, this bit vector indicates that another frequency band is preferred by cellular phone 110 over the band in which the negotiations are taking place. This bit vector may also indicate that more than one band is preferred, information about the bands and even preferences for that band, and levels of preference.

At 608, an indication that the other frequency band will be used is received. This indication may also require little throughput, like the bit vector transmitted at 606, such by being a bit vector having zeros for all bands of the set other than the band that will be used. Note that the indication may indicate that the same band will be used that was indicated as preferred at 606, or, if multiple bands were indicated as preferred, which of the preferred bands to use. In some cases a band or bands are indicated as preferred at 606 but none are indicated at 608, such as when a preferred band is preferred by the transmitting wireless peer device (here cellular phone 110) but not the receiving wireless peer device (here laptop computing device 114). In such a case the indication may indicate that the best band is the current band—the band at which the devices discovered each other and in which the negotiations are performed. As is apparent from this example, the operations of method 600 may work separate from or in concert with those of method 200, such as between two band negotiators 120 in two wireless peer devices 102.

At 610, communications are performed with wireless peer device at the other, indicated frequency band. This indicated band is a better band in some manner, such as it having a higher throughput than the current frequency band or using lower power. Portions of method 600 may be performed responsive to discovery, as noted at 602, or to degradation of a current band in which wireless peer devices are communicating. In such a case, one of the wireless peer devices 102 transmits a bit vector to begin a new negotiation to find a better band. In some cases a higher throughput frequency band may cease to be a best choice, in which case the devices may use operations of method 600 and/or 200 to find a better band, which sometimes is a band that does not have a highest possible throughput but does have a highest current throughput (e.g., due to interference).

Figure 7:
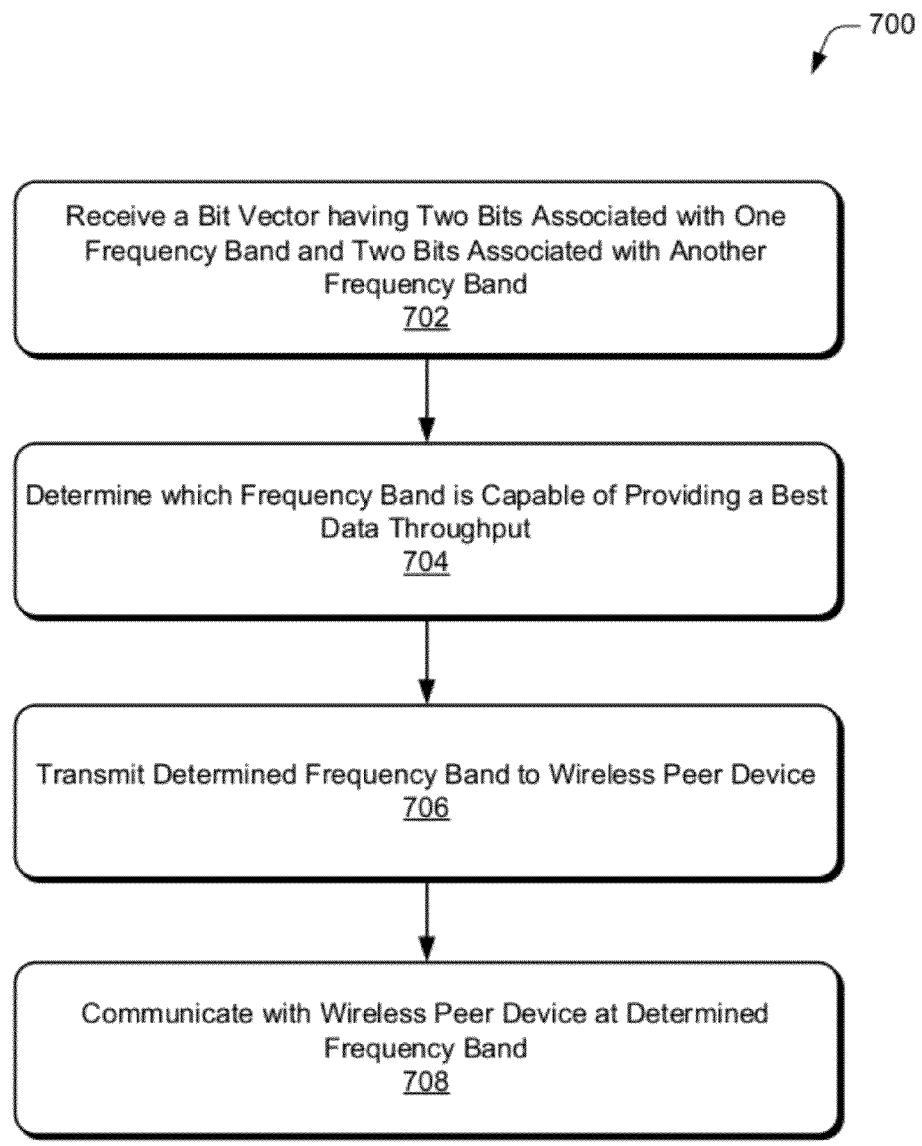
FIG. 7 illustrates a method for peer-to-peer frequency band negotiation using a bit vector having two bits associated with one frequency band and from the perspective of a wireless peer device that receives the bit vector and determines a preferred frequency band.

FIG. 7 depicts a method 700 for peer-to-peer frequency band negotiation using a bit vector having two bits associated with one frequency band and from the perspective of a wireless peer device that receives the bit vector and determines a preferred frequency band.

At 702, a bit vector having two bits associated with one frequency band and another two bits associated with another frequency band is received. Operation 702 may be preceded by discovery and/or non-discovery communications between a receiving wireless peer device that receives the bit vector at 702 and a transmitting wireless peer device that transmits the bit vector at 702.

Figure 8:
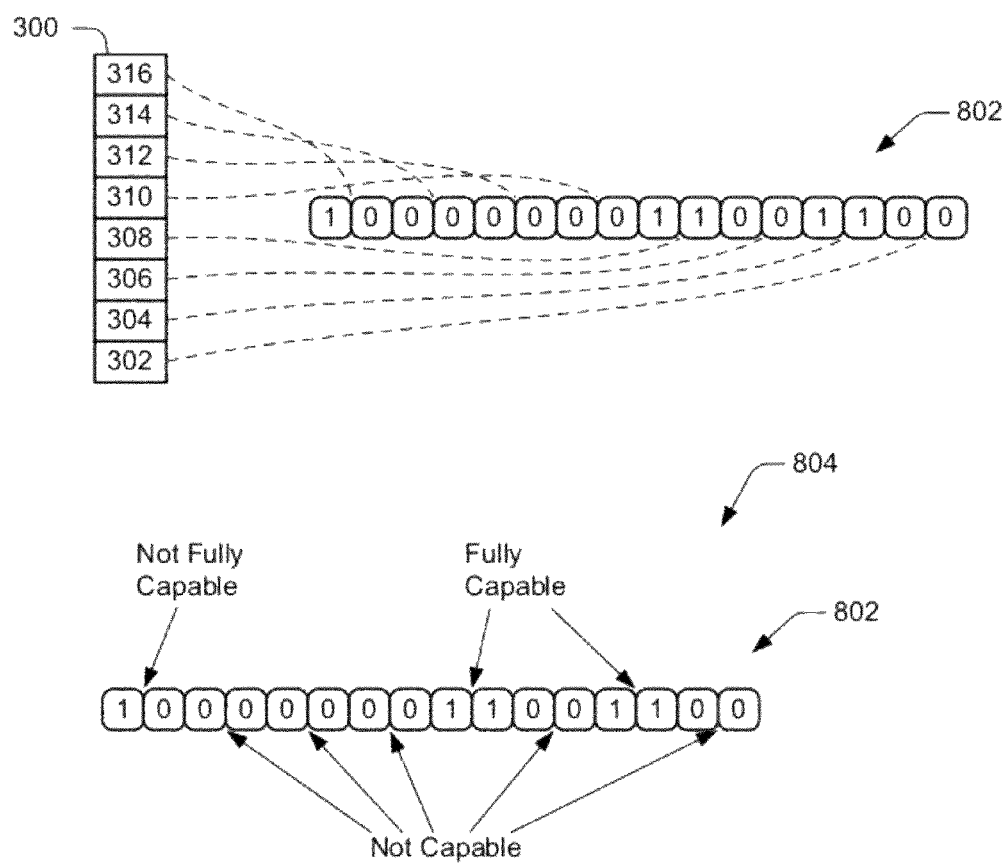
FIG. 8 illustrates a bit vector indicating three levels of preference for each of eight frequency bands of the set of predetermined frequency bands of FIG. 3 in accordance with one or more embodiments.

By way of illustration, consider bit vector 802 of FIG. 8. Bit vector 802 includes 16 bits, two bits for each of eight frequency bands of the set of predetermined frequency bands 300 of FIG. 3. Contrast this with bit vector 400, which has one bit per band (shown in FIG. 4). Note that bit vector 802 may include other bits having other information, such as protocol information, though this is not shown here.

As illustrated in FIG. 8 at 804, bit vector 802 indicates three levels of preference for each of the eight frequency bands 302 through 316. Two bits may also indicate four levels, though in this example three are represented. A first bit of each two-bit group associated with a band indicates whether the frequency band is at all capable for use. If the first bit is a zero, the frequency band is not capable of being used by the transmitting wireless peer device. If the first bit is one, the frequency band is capable, though whether it is fully capable or not fully capable is indicated by a one or a zero, respectively, in the next bit. These levels are illustrated at 804 in FIG. 8. These bits indicate that frequency band 316 is capable of being used by the transmitting wireless peer device (110) but that it is not fully capable, likely due to minor, but not negligible, interference. These bits also indicate that cellular phone 110 is not capable of communicating in bands 314, 312, 310, 306, and 302 (shown by "00"). Cellular phone 110 is fully capable at bands 308 and 304 (shown by "11").

Continuing, in part, the prior examples, assume that cellular phone 110 as shown in FIG. 5 transmits, instead of bit vector 400, bit vector 802 to laptop computing device 114, which is received at 702.

At 704, the band capable of providing a best data throughput is determined. Here band negotiator 120, operating on laptop computing device 114, receives bit vector 802 and determines, based on the bits of the bit vector and laptop computing device 114's own preferences, that band 308 is the band having the best data throughput.

In one case, band negotiator 120, operating on device 114, determines device 114's preferences, represents these in a bit vector, and then performs an operation on the received bit vector (bit vector 802) and its own bit vector (not shown). By so doing, a resulting bit vector is produced, which indicates that bands 308 and 304 are fully capable for both wireless peer devices 114 and 110, but that band 316, while possible, is not fully capable and thus, based on band information 124 of FIG. 1, is not the best band to use. This band information 124 also indicates that band 308 is superior to band 304. In some cases a frequency band, even if not fully capable, will be superior to a band that is fully capable because that not-fully-capable band is that much superior to the other band. A band on which two devices discover each other, even though it may be fully capable for both devices, may still be inferior to another band even when that band has some interference or other problem.

Band information 124 may include information sufficient to quickly determine which band is best, even based on simple operations on a received bit vector. Thus, a simple table may indicate which result indicates which band is best. For example, a "10" from a transmitting wireless peer device added to a "11" from a receiving device for a potentially high-throughput band (e.g., 316) is superior to a "11" and another "11" of a low-throughput band (e.g., 302 or 304) but be inferior to a moderate-throughput band (e.g., 308 or 310) if that moderate band is fully capable ("11" and "11") by both the transmitting and receiving wireless peer devices.

At 706, a determined frequency band is transmitted to the wireless peer device. Here the device from which the bit vector is received at 702 is transmitted the band determined to be the band currently having the best data throughput. Here band negotiator 120 operating on laptop computing device 114 transmits a bit vector indicating that band 308 is the best band.

At 708, communications with the wireless peer device at the determined frequency band commence. Here both wireless peer devices 102 cease communicating at the band in which they discovered each other (band 304) and commence communicating at the higher data-throughput band 308.

System-on-Chip

Figure 9:
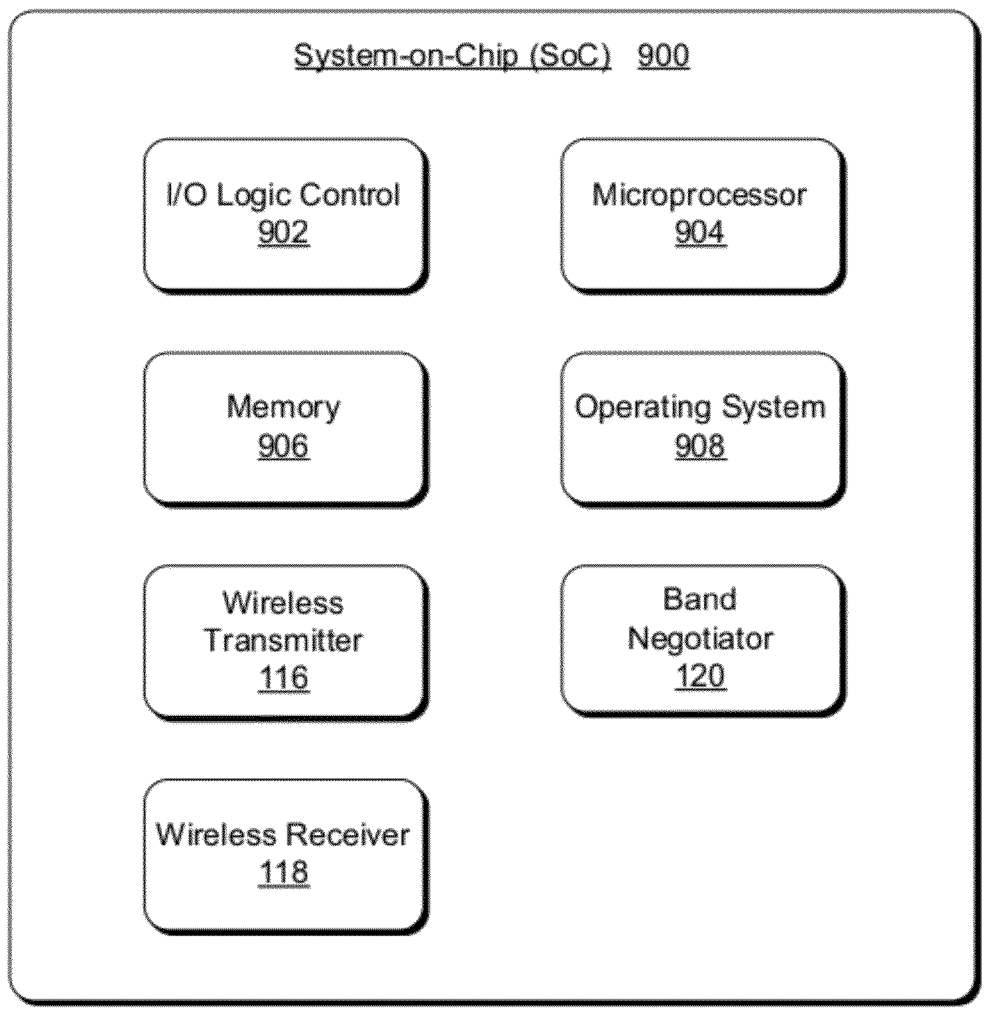
FIG. 9 illustrates a System-on-Chip (SoC) environment for implementing embodiments of the techniques described herein.

FIG. 9 illustrates a System-on-Chip (SoC) 900, which can implement various embodiments described above. An SoC can be implemented in a fixed or mobile device, such as one or a combination of a media device, computer device, television set-top box, video processing and/or rendering device, appliance device, gaming device, electronic device, vehicle, workstation, WLAN peer device/client station, and/or in any other type of device that may communicate wirelessly in a local or personal area network. Examples of some of these are shown in FIG. 1 at 102.

SoC 900 can be integrated with electronic circuitry, a microprocessor, memory, input-output (I/O) logic control, communication interfaces and components, other hardware, firmware, and/or software needed to run an entire device. SoC 900 can also include an integrated data bus (not shown) that couples the various components of the SoC for data communication between the components. A device that includes SoC 900 can also be implemented with many combinations of differing components.

In this example, SoC 900 includes various components such as an input-output (I/O) logic control 902 (e.g., to include electronic circuitry) and a microprocessor 904 (e.g., any of a microcontroller or digital signal processor). SoC 900 also includes a memory 906, which can be any type of random access memory (RAM), a low-latency nonvolatile memory (e.g., flash memory), read only memory (ROM), and/or other suitable electronic data storage. SoC 900 can also include various firmware and/or software, such as an operating system 908, which can be computer-executable instructions maintained by memory 906 and executed by microprocessor 904. SoC 900 can also include other various communication interfaces and components, wireless LAN (WLAN) or PAN (WPAN) components, other hardware, firmware, and/or software.

SoC 900 includes wireless transmitter 116, wireless receiver 118, and band negotiator 120 (in either or multiple devices as noted above). Examples of these various components, functions, and/or entities, and their corresponding functionality, are described with reference to the respective components of the environment 100 shown in FIG. 1.

Band negotiator 120 in SoC 900, either independently or in combination with other entities, can be implemented as computer-executable instructions maintained by memory 906 and executed by microprocessor 904 to implement various embodiments and/or features described herein. Band negotiator 120 may also be provided integral with other entities of the SoC, such as integrated with one or both of wireless transmitter 116 and wireless receiver 118. Alternatively or additionally, band negotiator 120 and the other components can be implemented as hardware, firmware, fixed logic circuitry, or any combination thereof that is implemented in connection with the I/O logic control 902 and/or other signal processing and control circuits of SoC 900.

Although the subject matter has been described in language specific to structural features and/or methodological operations, the subject matter defined in the appended claims is not necessarily limited to the specific features or operations described above, including orders in which the operations are performed.

What is claimed is:

1. A method comprising:

discovering a first wireless peer device at a first frequency band of a predetermined set of frequency bands;

receiving a bit vector at the first frequency band from the first wireless peer device, a bit of the bit vector associated with a second frequency band of the predetermined set of frequency bands and indicating a first-device communication capability at the second frequency band;

determining, based on the bit of the bit vector and a second-device communication capability at the second frequency band for communications by a second wireless peer device, that the second frequency band is preferred over the first frequency band for communications between the first wireless peer device and the second wireless peer device; and causing the second wireless peer device to communicate with the first wireless peer device at the second frequency band.

2. The method of claim 1, wherein the bit is a first bit, the second-device communication capability at the second frequency band is represented by a second bit not of the bit vector, and the act of determining performs an add operation on the first bit and the second bit.

3. The method of claim 1, wherein the bit is a first bit and the bit vector comprises second, third, and fourth bits, each of the second, third, and fourth bits associated with and indicating a second, a third, and a fourth first-device communication capability or incapability, respectively, with a third, fourth, and fifth frequency band of the predetermined set of frequency bands.

4. The method of claim 3, wherein:

the bit vector is a received bit vector; and the method further comprises transmitting a transmitted bit vector from the second wireless peer device to the first wireless peer device, the transmitted bit vector including a first transmitted bit indicating the second-device communication capability at the second frequency band, and a second transmitted bit, a third transmitted bit, and a fourth transmitted bit, each of the second, third, and fourth transmitted bits associated with and indicating a third, fourth, and fifth second-device communication capability or incapability, respectively, with the third, fourth, and fifth frequency band of the predetermined set of frequency bands.

5. The method of claim 4, wherein the act of determining performs an add operation on the received bit vector and the transmitted bit vector to provide a result, the result indicating that only the second frequency band of the second, third, fourth, and fifth frequency bands is preferred.

6. The method of claim 1, wherein the second frequency band is predetermined to be at a higher throughput than the first frequency band.

7. The method of claim 1, wherein the bit vector comprises additional bits also associated with the bit, the additional bits indicating a protocol type and a protocol length for communications within the second frequency band.

8. The method of claim 1, further comprising, prior to the act of causing communication with the first wireless peer device at the second frequency band, transmitting, to the first wireless peer device, an indication that the second frequency band will be used.

9. A method comprising:

a second wireless peer device discovering a first wireless peer device at a first frequency band of a set of predetermined frequency bands;

transmitting, from the second wireless peer device, a bit vector to the first wireless peer device at the first frequency band, a bit of the bit vector associated with a second frequency band of the set of predefined frequency bands and indicating a second-device communication capability at the second frequency band;

receiving, responsive to transmitting the bit vector, an indication that the second frequency band will be used by the first wireless peer device; and causing the second wireless peer device to communicate with the first wireless peer device at the second frequency band.

10. The method of claim 9, wherein the bit vector is a first bit vector and wherein the indication is a second bit vector.

11. The method of claim 9, further comprising, prior to the act of transmitting the bit vector, determining that the second frequency band is preferred over the first frequency band by the second wireless peer device.

12. The method of claim 11, wherein:

the act of determining determines that the second wireless peer device is operating in a geographical region in which the second frequency band is subject to a government mandate requiring the second wireless peer device to passively search for radar transmissions on the second frequency band before transmitting at the frequency; and the method further comprises passively searching for and not finding radar transmissions on the second frequency band.

13. The method of claim 11, wherein the act of determining comprises scanning the second frequency band for interference.

14. The method of claim 11, wherein the act of determining comprising determining that the second frequency band is not being communicated on by the second wireless peer device.

15. The method of claim 11, wherein the act of determining comprises determining a geographical location of the second wireless peer device, the geographical location affecting the second-device communication capability at the second frequency band.

16. The method of claim 9, wherein the bit is a first bit and the bit vector includes a second bit, the second bit associated with a third frequency band of the set of frequency bands and indicating an incapability of the second wireless peer device to communicate at the third frequency.

17. The method of claim 9, wherein the first frequency band is determined, prior to the act of discovering, to have inferior potential data throughput compared to that of the second frequency band.

18. A method comprising:

receiving a bit vector at a first frequency band of a predetermined set of frequency bands from a first wireless peer device, two bits of the bit vector associated with a second frequency band of the predetermined set of frequency bands and indicating three or more levels of communication preference of the first wireless peer device at the second frequency band and another two bits of the bit vector associated with a third frequency band of the predetermined set of frequency bands and indicating three or more levels of communication preference of the first wireless peer device at the third frequency band;

determining, based on the two bits, the other two bits, and two or more levels of communication preference of a second wireless peer device at the second frequency band and two or more levels of communication preference of the second wireless peer device at the third frequency band, whether the first frequency band, the second frequency band, or the third frequency band is capable of providing a best data throughput for future communications between the first wireless peer device and the second wireless peer device; and transmitting information with respect to the determined frequency band to the first wireless peer device.

19. The method of claim 18, further comprising, subsequent to the act of transmitting the information with respect to the determined frequency band to the first wireless peer device, causing the second wireless peer device to communicate with the first wireless peer device at the determined frequency band.

* * * * *